United States Patent
Hardee et al.

(10) Patent No.: US 10,623,414 B2
(45) Date of Patent: Apr. 14, 2020

(54) AUTHENTICATING MULTI-FACETS OF A USER THROUGH UNAWARE THIRD-PARTY SERVICES

(71) Applicant: International Business Machines Corporation, Armonk, NY (US)

(72) Inventors: Christopher J. Hardee, Raleigh, NC (US); Steven R. Joroff, River Vale, NJ (US); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 352 days.

(21) Appl. No.: 15/497,339

(22) Filed: Apr. 26, 2017

(65) Prior Publication Data
US 2018/0316654 A1    Nov. 1, 2018

(51) Int. Cl.
| G06F 7/04 | (2006.01) |
| G06F 15/16 | (2006.01) |
| G06F 17/30 | (2006.01) |
| H04L 29/06 | (2006.01) |
| G06F 21/41 | (2013.01) |

(52) U.S. Cl.
CPC ............ *H04L 63/105* (2013.01); *G06F 21/41* (2013.01); *H04L 63/083* (2013.01)

(58) Field of Classification Search
CPC ....... H04L 63/10; H04L 63/105; H04L 63/08; H04L 63/083; H04L 9/32; H04L 9/3271; G06F 21/30; G06F 21/31; G06F 21/316; G06F 21/36; G06F 21/41; G06F 2221/2103
See application file for complete search history.

(56) References Cited

U.S. PATENT DOCUMENTS

| 7,631,346 B2 | 12/2009 | Hinton et al. | |
| 9,967,262 B1* | 5/2018 | Santos | H04L 67/306 |
| 10,025,914 B1* | 7/2018 | Hatch | G06F 21/316 |
| 2005/0039054 A1* | 2/2005 | Satoh | H04L 63/0815 |
| | | | 726/4 |
| 2007/0208941 A1* | 9/2007 | Backer | H04L 9/321 |
| | | | 713/170 |
| 2008/0172288 A1* | 7/2008 | Pilskalns | G06Q 30/02 |
| | | | 705/14.23 |
| 2009/0193510 A1* | 7/2009 | Makkinejad | G06F 21/31 |
| | | | 726/9 |
| 2016/0014128 A1* | 1/2016 | Perrone, II | H04L 63/0892 |
| | | | 726/7 |
| 2016/0164885 A1 | 6/2016 | Kirkham et al. | |
| 2016/0219046 A1* | 7/2016 | Ballard | H04L 63/0861 |

* cited by examiner

*Primary Examiner* — Trong H Nguyen
*Assistant Examiner* — Amie C. Lin
(74) *Attorney, Agent, or Firm* — Cantor Colburn LLP; Samuel Waldbaum (57) ABSTRACT

Embodiments include method, systems and computer program products for validating a user logon credential. The method includes providing a verification artifact. The method also includes determining an existence of a user post of the verification artifact on the third party system. The method further includes validating the user logon credential based on the user post of the verification artifact on the third party system.

18 Claims, 5 Drawing Sheets

AUTHENTICATING MULTI-FACETS OF A USER THROUGH UNAWARE THIRD-PARTY SERVICES

BACKGROUND

The present invention relates to online user authentication, and more specifically, to authenticating multi-facets of a user through unaware third-party services or systems.

Authentication enables human-to-machine interactions on both wired and wireless networks by controlling access to networked and Internet connected systems and resources. User identification and authentication can occur in a variety of ways. A known user authentication method is requiring a user to enter a user ID and a password.

SUMMARY

Embodiments of the present invention are directed to a computer-implemented method for validating a user logon credential. A non-limiting example of the method includes providing a verification artifact. The method also includes determining an existence of a user post of the verification artifact on the third party system. The method further includes validating the user logon credential based on the user post of the verification artifact on the third party system.

One or more embodiments of the present invention provide a system for validating a user logon credential. A non-limiting example of the system includes a processor configured to provide a verification artifact. The processor can be further configured to determine an existence of a user post of the verification artifact on the third party system. The processor can be further configured to validate the user logon credential based on the user post of the verification artifact on the third party system.

One or more embodiments of the present invention provide a computer program product comprising a computer-readable storage medium is described. The computer-readable storage medium may include program instructions that are executable by a processor to cause a computer to perform a method for validating a user logon credential. The computer-readable storage medium includes program instructions for performing a method. A non-limiting example of the method includes providing a verification artifact. The method also includes determining an existence of a user post of the verification artifact on the third party system. The method further includes validating the user logon credential based on the user post of the verification artifact on the third party system.

BRIEF DESCRIPTION OF THE DRAWINGS

The subject matter regarded as the invention is particularly pointed out and distinctly claimed in the claims at the conclusion of the specification. The forgoing and other features and advantages of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

On the internet, it is difficult to verify the validity of someone's credentials. For example, someone logging in to a web site for the first time, until the person creates an account and associates some personal information to that account, there is not much known about that person besides some observable data such as the IP address of the person. Also, even if a user gives their personal information and attests to who they are, there has to be some means to verify they are whom they say they are. A typical approach to verifying an email address given, is as simple as sending an email to the user, and then having them follow a link in order to verify the email address they gave is owned by them.

Some consumer web sites have the ability for a user to create an account on a system simply by proving they have an account on another third-party trusted system. For example, on a music streaming service, a user can create a new account by logging on to their social media account first. This process is very common and uses the Login API of the particular social media platform. This type of single-sign on approach may have security disadvantages. For example, a malicious pop-up web page made to look identical to the social media login box could be used to steal a user's user ID and password on the social media site.

Another disadvantage is that not all third-party platforms have this API login authorization capability, even though a system may want to associate an account with them.

Another disadvantage of current methods is that some users maintain multiple login credentials that are different for each social media or other third party platform. With multiple logins, a system cannot piggy-back on the credentials of another third-party service without forcing the user to provide multiple credentials, which they may be reluctant to share due to the security concerns mentioned above.

Moreover, if a system can verify a user's credentials on a third-party service such as a social media site, the credentialing provides only one facet of the user's credential story. Accordingly, it may be advantageous to provide a system that solves this problem to piece together a more complete picture of the user by verification of the user credentials from two or more other third party services. These multiple facets can be confirmed, and then associated with an account on the system without these other services even knowing, approving, or having to provide an application program interface (API).

Embodiments of the present invention provide credential verification systems for a web site to establish a new user account on the web site through the aggregation of existing credentials the new user has on other third-party services. In some aspects of the invention, the present system may output a prompt for the user to post one or more artifacts such as a public message, an image, or some other artifact on the third-party service's site. The system may determine whether the one or more artifacts instructed to the subject user were posted, and make a credential validation decision based on that finding. If the third-party service has multiple levels of membership, such as normal member and premium member, in some aspects a public posting location may be selected by the processor that allows the subject system to clearly differentiate the membership levels or access level of the user on that particular service.

According to some embodiments, the posting content, location, and type is completely under the direction of the system seeking credential verification with the third-party service. When and if the processor of the present system verifies that the publicly posted content was posted by a particular user on the third-party system, then the processor may unlock that credential facet and associate it with the user account on the subject system. In some aspects, other information from that third-party service can be pulled-in to populate the user's record on the directing system, or, because the credential on the other service is persistently associated, the processor may dynamically query user information from the third-party service as needed from the third-party service.

Figure 1A:
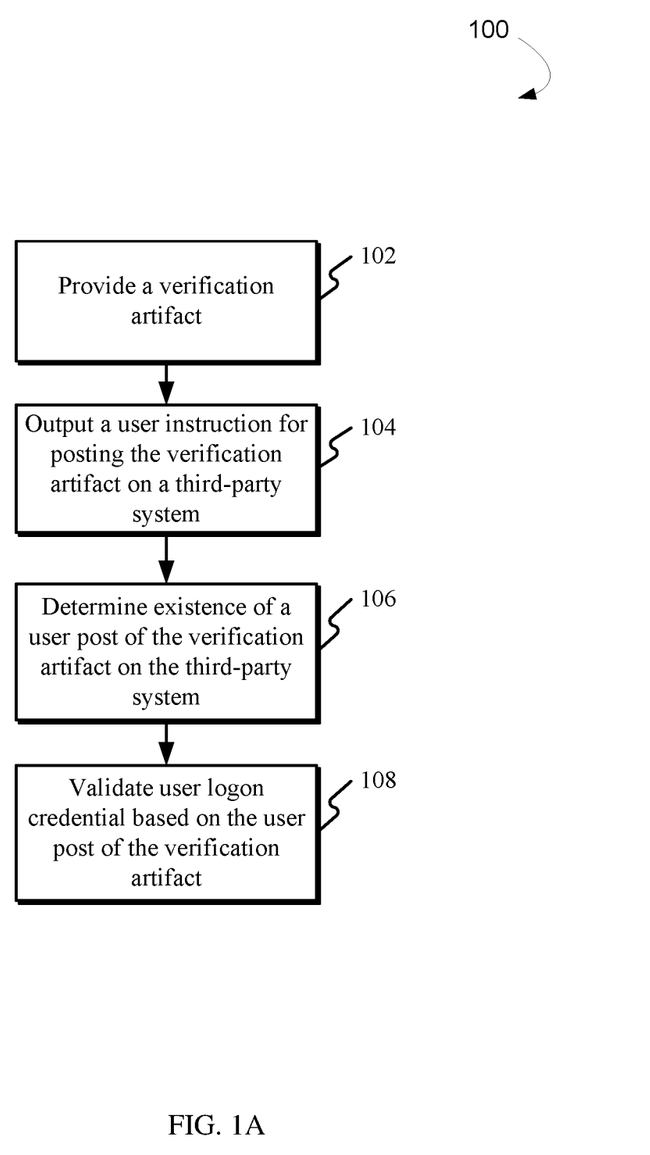
FIG. 1A depicts a flow diagram of a computer-implemented method for validating a user logon credential according to one or more embodiments of the present invention.

Now considering embodiments of the present invention in greater detail, FIG. 1A depicts a computer-implemented method 100 for validating a user logon credential, according to one or more embodiments of the present invention. When a user is establishing a new account with a website (i.e., during account sign-up) a processor operating on the system (e.g., processor 401 described in greater detail below with respect to FIG. 4) may present one or more user-selectable options for the user to associate their requested sign-up credentials with one or more existing third-party accounts. An example of a third party account may be a social media account or other account with which the user has an established account and login. The third-party account must be associated with a publicly-viewable user-posting portion that is capable of receiving one or more publicly-viewable messages that include, for example, text, a picture, a sound file, or some other artifact. The third-party system hosting the account is distinct and separate from the present system, and does not share credentials with the present system. In some aspects, processor 401 may present one or more user-selectable items indicative that, when selected, the user wishes to establish the new login credentials with one or more existing third-part login credentials.

Responsive to one or more user selections, processor 401 may output one or more data entry windows instructing the user to provide an identifier (i.e., logon name, user name, etc.). The identifier may be, for example, a text string, a number, a URI, or an email address, as long as it uniquely identifies that person on the third-party system. It could be a sound file or photograph, picture or other image file, such as a QR code, as long as it can be used to verify the public postings of a user on that service. In this case, let us say the third-party service is a social media website Gaggle+. The user checks the Gaggle+ box and provides their Gaggle+ account email address. There may be many other services listed in addition to Gaggle+, and the user can check as many as they desire. As an incentive for the user to select more third party web sites, the present system may offer a more diverse set of features the new web site for which the user is requesting access.

After the user presses the submit button, as shown in block 104, processor 401 may output one or more user instructions for posting the verification artifact on a third-party system. Accordingly, as shown in block 102, processor may provide a verification artifact to the user. A verification artifact may be, for example, an audio file, a video file, an image file, a number or text string. Processor 401 may provide the verification artifact responsive to a user request to download the artifact. In some aspects, processor 401 may instruct the user to post the artifact on the third-party system. In the example of a third-party system Gaggle+, the user is instructed to post a particular publicly-viewable image that the entire world can see without using a particular login, username, credential, etc. The artifact may be an image (of anything) that may later be verified by processor 401 that it exists as posted by the account (provided identifier) associated with the given user on the third-party system.

According to one or more embodiments, the image artifact could include steganographic encoding. In some aspects, processor 401 may verify that this steganographically encoded picture was indeed posted by the unique user that is requesting a new account on the subject system. This extra encoding step may also prevent other people from using this public image (the artifact) for any sort of other validation purposes on a similar web site.

As shown in block 106, processor 401 may determine an existence of a user post of the verification artifact on the third party system. Accordingly, processor 401 may access the third-party system, search for, and identify a publicly-viewable posting of the artifact. The artifact, which is associated with a known identifier, may be viewable in a single access level of the third-party system. In other words, the third-party system may be a free site (that does not charge for access) and have only a single tier of access levels.

Other third-party systems may have free portions of the web site, and paid portions of the web site, which may each include different features but both be publicly-viewable without logon access. By verifying a user credential through a paid-access portion of a third-party system, it may be indicative of a higher probability of trustworthiness of the requesting user. For example, a user having a paid account in the third-party system may be more readily identifiable as an authentic user than a user accessing a free site. In other aspects, processor 401 may determine whether the third party system includes two or more access levels configured to receive a user post, differentiate a first access level from a second access level from the two or more access levels, and validate the user logon credential based on a posting location of the verification artifact at one of the first access level and the second access level. In one example, the first access level may be a free portion of the third-party system, and the second portion may a paid portion of the third-party system.

As shown in block 108, processor 401 may validate the user logon credential based on the user post of the verification artifact on the third party system. In some aspects, processor 401 may verify the posted artifacts on third-party system at predetermined verification intervals (e.g., at +10 seconds, at +15 seconds, etc.) or provide a user-selectable button after the artifact has been posted. Therefore, the verification process could be asynchronous or synchronous after instructing the user to post the artifact. After processor 401 has verified the artifact, the user can optionally delete the post on the third-party website.

Figure 1B:
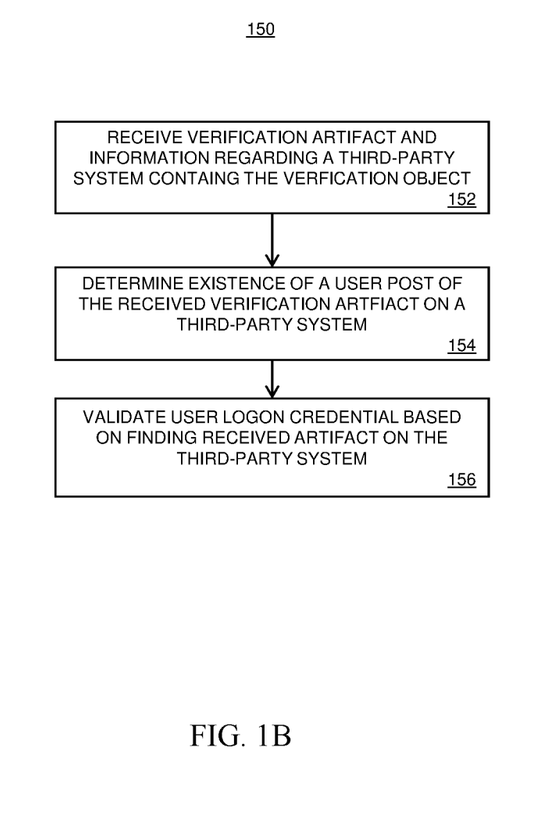
FIG. 1B depicts a flow diagram of a computer-implemented method for validating a user logon credential according to one or more embodiments of the present invention.

Now considering further embodiments of the present invention in greater detail, FIG. 1B depicts a computer-implemented method 150 for validating a user logon credential, according to one or more embodiments. When a user is establishing a new account with a website (i.e., during account sign-up), the user may present one or more user-selectable options to associate their requested sign-up credentials with one or more existing third-party accounts. As previously mentioned, the third-party system hosting the account is distinct and separate from the present system, and does not share credentials with the present system. In some aspects, the user may present one or more user-selectable items in order to establish new login credentials with one or more existing third-part login credentials.

The user may provide an identifier (i.e., logon name, user name, etc.) to the processor 401. The identifier may be, for example, a text string, a number, a URI, or an email address, as long as it uniquely identifies that person on the third-party system. It could be a sound file or photograph, picture or other image file, such as a QR code, as long as it can be used to verify the public postings of a user on that service. For example, the user may post an image on a social network feed and notify the system to check the social network and verify the posting of the image in order to establish new login credentials.

Accordingly, in block 152, the user may provide a verification artifact and third-party system containing the provided verification artifact to the processor 401. A verification artifact may be, for example, an audio file, a video file, an image file, a number or text string. In some aspects, the user may post the artifact on the third-party system. The artifact may be an image (of anything) that may later be verified by processor 401 as existing as posted by the account (provided identifier) associated with the given user on the third-party system.

As shown in block 154, processor 401 may determine an existence of a user post of the verification artifact provided by the user to the processor 401 on the third party system. Accordingly, processor 401 may access the third-party system, search for, and identify a publicly-viewable posting of the artifact.

As shown in block 156, processor 401 may validate the user logon credential based on confirmation of the user post of the verification artifact on the third party system. After processor 401 has verified the artifact, the user can optionally delete the post on the third-party website.

The processor 401 may fail to validate the user logon credentials if the processor 401 determines that the verification artifact received from the user is below a predetermined security level. The processor 401 may also fail to validate the user logon credentials if the processor 401 determines the user has not provided adequate proof verifying the identity of the user on the third party system.

According to one or more embodiments, if the third-party service is a social music posting service, then an audio file artifact might be the artifact that is required to be posted in order for the music posting service credentials to be confirmed.

According to one or more embodiments, the verification artifact may be an advertisement for the system or web site to which the user is establishing logon credentials, where the advertisement is uniquely encoded having information indicative this particular account and/or identifier on the new system.

In one or more embodiments, the artifact may be an acceptance of a user invite on a third-party gaming platform. Accordingly, the user may prove their gamer tag as the identifier on a given gaming network and the artifact may be a predetermined text string posted on the gaming network. In other aspects, the user may be instructed to accept a friend request of a particular fictional user.

Various embodiments of the present invention may provide several advantages. For example, the third-party service need not be aware that the present system is using them for credential confirmation. Additionally, the third-party service does not need to expose a special API for the purpose of credential verification. Yet another benefit is that the user drives the credential verification process, and thus cannot mistakenly give-up their third-party login information. A web site or system only need to develop the code for public posting verification on each third-party service, so nearly all services that allow for some public posting of content, can be used to authenticate credentials.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least four service models, and at least four deployment models.

Characteristics of a Cloud Model:

On-demand self-service: a cloud consumer can unilaterally provision computing capabilities, such as server time and network storage, as needed automatically without requiring human interaction with the service's provider.

Figure 4:
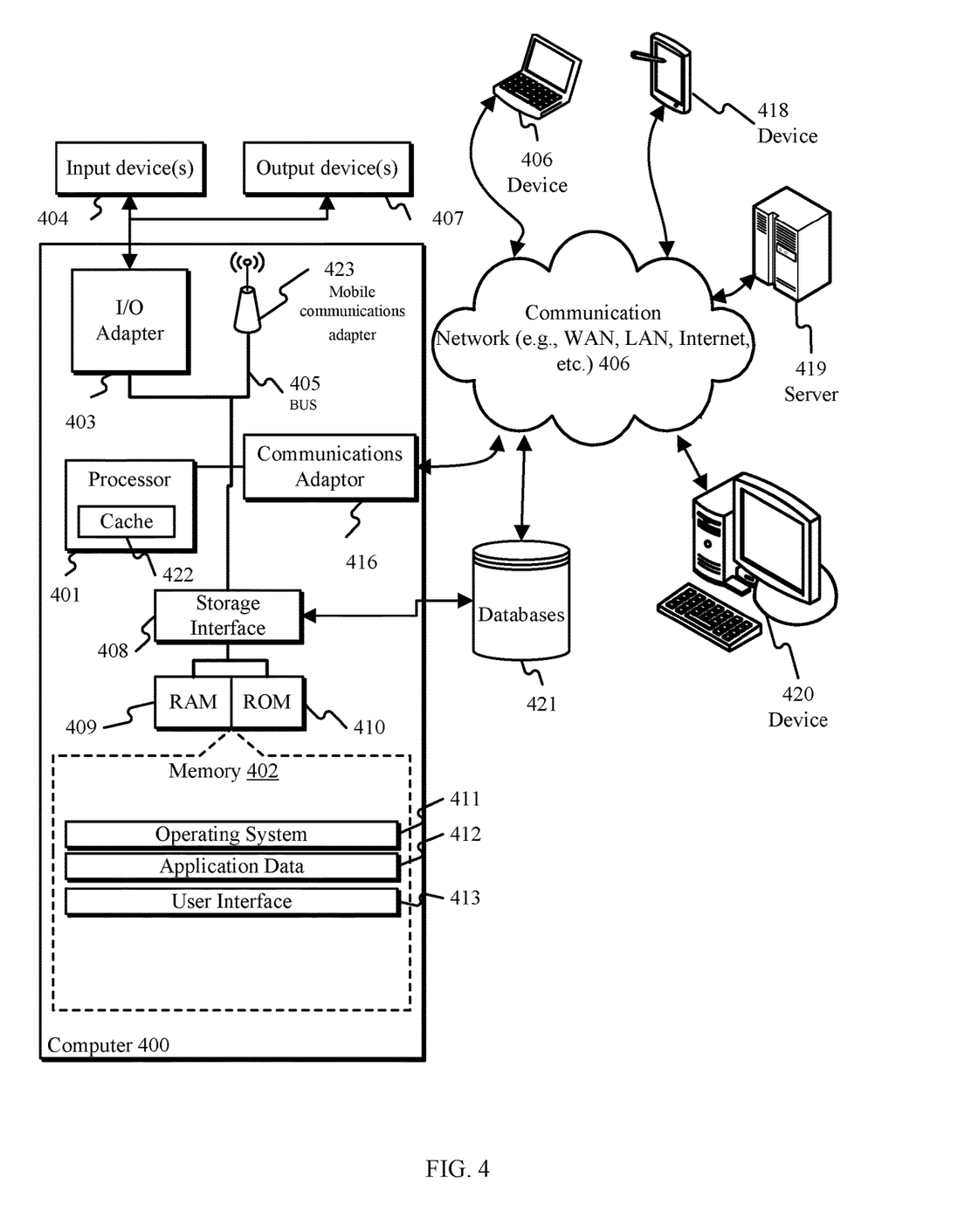
FIG. 4 depicts a block diagram of a computer system and environment, according to at least one embodiment.

Broad network access: capabilities are available over a network (e.g., network 406, as depicted in FIG. 4) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 406, as depicted in FIG. 4), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 406, as depicted in FIG. 4), servers, operating systems, or storage, but has control over the deployed applications and possibly application hosting environment configurations.

Infrastructure as a Service (IaaS): the capability provided to the consumer is to provision processing, storage, networks (e.g., network 406, as depicted in FIG. 4), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems may include monitoring engines to track performance and usage, error monitoring, and data analysis engines.

Deployment Models:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 2:
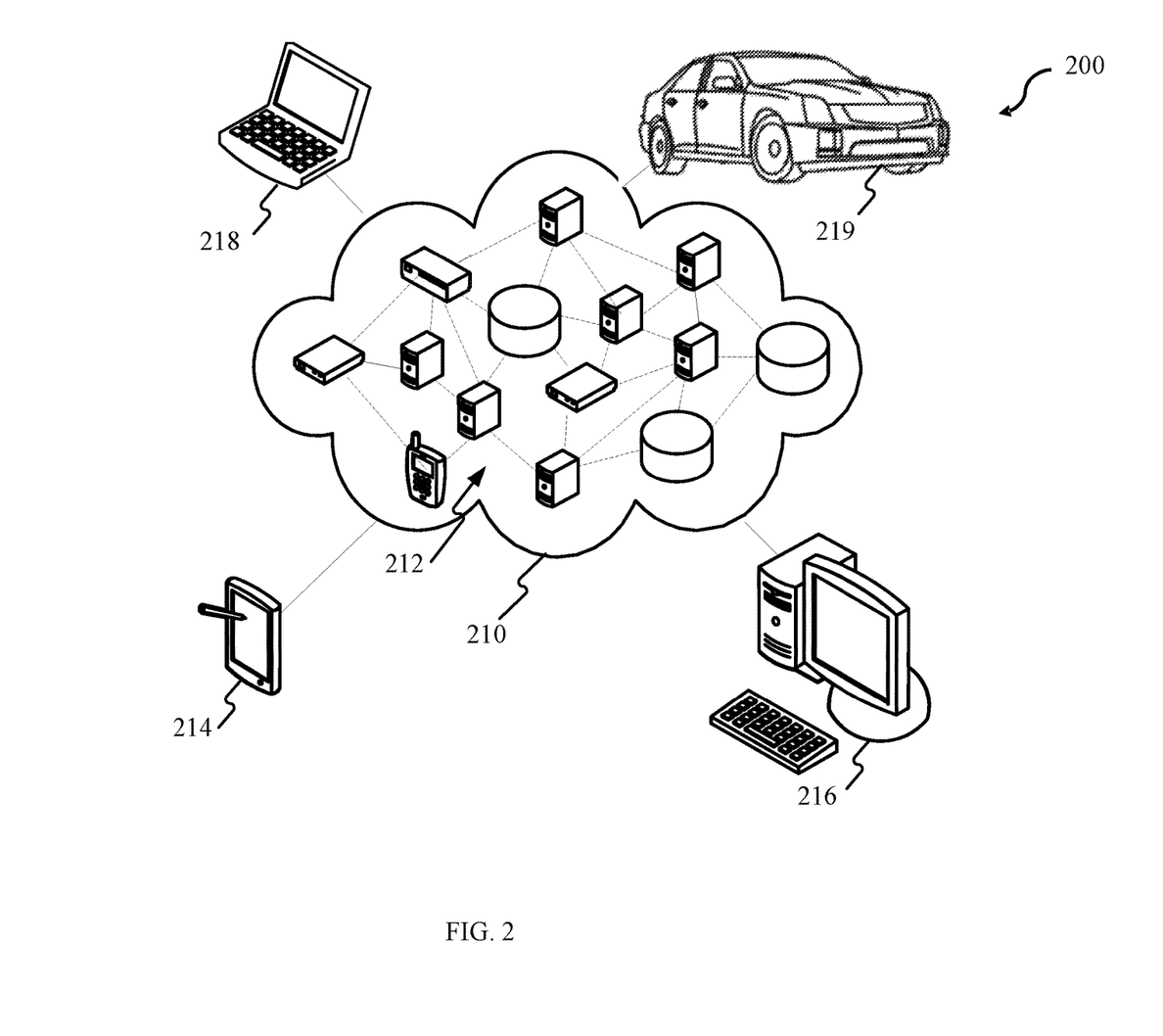
FIG. 2 depicts a cloud computing environment according to one or more embodiments.
Figure 3:
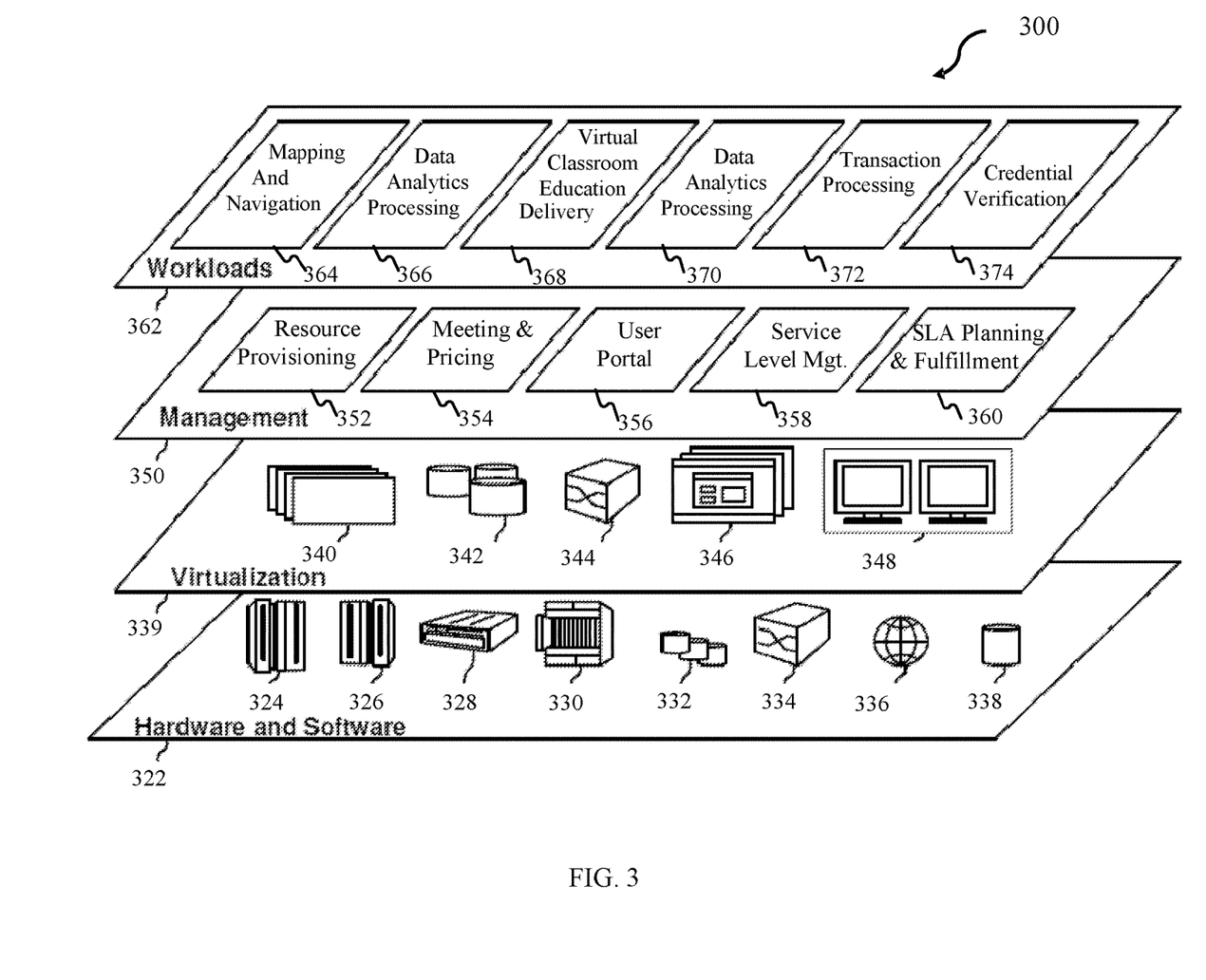
FIG. 3 depicts abstraction model layers according to at least one embodiment.

Referring now to FIG. 2, a cloud computing environment 200 for use in practicing the teachings herein is depicted. As shown in FIG. 2, cloud computing environment 200 comprises one or more cloud computing nodes 212 with which local computing devices used by cloud consumers, such as, for example, a mobile device 214, a desktop computer 216, a laptop computer 218, and/or an automobile computer system 219 may communicate. Cloud computing nodes 212 may communicate with one another. They may be grouped (not shown) physically or virtually, in one or more networks 210, such as a Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 214-219 shown in FIG. 2 are intended to be illustrative only and that cloud computing nodes 212 and cloud computing environment 200 can communicate with any type of computerized device over any type of network and/or network addressable connection (e.g., using a web browser).

Referring now to FIG. 4, a set of functional abstraction layers 420 provided by cloud computing environment 10 (as depicted in FIG. 2) is shown. It should be appreciated that the components, layers, and functions of functional abstraction layers 420 depicted in FIG. 4 are illustrative only, and embodiments of the invention are not limited thereto. As depicted, the following layers and corresponding functions are provided:

A hardware and software layer 422 may include hardware and software components. Examples of hardware components can include, for example, mainframes 424, 4RISC (Reduced Instruction Set Computer) architecture based servers 426, servers 428, blade servers 440, storage devices 442, and networks and networking components 444. In some embodiments, software components include network application server software 446 and database software 448.

A virtualization layer 449 may provide an abstraction layer from which the following examples of virtual entities may be provided: virtual servers 440, virtual storage 442, virtual networks 444, which may include virtual private networks, virtual applications and operating systems 446, and virtual clients 448.

In one example, a management layer 450 may provide the functions described below. A resource provisioning module 452 can provide dynamic procurement of computing resources and other resources that may be utilized to perform tasks within the cloud computing environment. A metering and pricing resource 454 may provide cost tracking as resources are utilized within the cloud computing environment, and billing or invoicing for consumption of these resources. In one example, metering and pricing resources may include application software licenses. A user portal 456 may provide access to cloud computing environment 200 for consumers and system administrators (not shown). In some embodiments, user portal 456 may provide security and/or identity verification for cloud consumers (e.g., one or more consumers operating one or more of computing devices 214-219) and tasks, as well as protection for data and other resources. A service level management resource 458 can provide cloud computing resource allocation and management such that required service levels are met. A service level agreement (SLA) planning and fulfillment resource 460 may provide pre-arrangement for, and procurement of cloud computing resources for which a future requirement is anticipated in accordance with an SLA.

A workloads layer 462 may provide functionality for which the cloud computing environment may be utilized. For example, workloads layer 462 may include a mapping and navigation resource 464, a software development and lifecycle management resource 466, a virtual classroom education delivery resource 468, a data analytics processing resource 470, a transaction processing resource 472, and credential verification 474.

FIG. 4 illustrates a block diagram of an exemplary computing environment and computer system 400 for use in practicing the embodiments described herein. The environment and system described herein can be implemented in hardware, software (e.g., firmware), or a combination thereof. In some exemplary embodiments, a hardware implementation may include a microprocessor of a special or general-purpose digital computer, such as a personal computer, workstation, minicomputer, or mainframe computer. Computer 400 therefore can embody a general-purpose computer. In some exemplary embodiments, the implementation can be part of a mobile device, such as, for example, a mobile phone, a personal data assistant (PDA), a tablet computer, etc.

As shown in FIG. 4, the computer 400 includes processor 401. Computer 400 also includes memory 402 communicatively coupled to processor 401, and one or more input/output adapters 404 that may be communicatively coupled via system bus 405. Memory 402 may be communicatively coupled to one or more internal or external memory devices via a storage interface 408. Communications adapter 416 may communicatively connect computer 400 to one or more networks 406. System bus 405 may communicatively connect one or more user interfaces via input/output (I/O) adapter 404. I/O adapter 404 may connect a plurality of input devices 404 to computer 400. Input devices may include, for example, a keyboard, a mouse, a microphone, a sensor, etc. System bus 405 may also communicatively connect one or more output devices 407 via I/O adapter 404. Output device 407 may include, for example, a display, a speaker, a touchscreen, etc.

Processor 401 is a hardware device for executing program instructions (aka software), stored in a computer-readable memory (e.g., memory 402). Processor 401 can be any custom made or commercially available processor, a central processing unit (CPU), a plurality of CPUs, for example, CPU 401a-401c, an auxiliary processor among several other processors associated with the computer 400, a semiconductor based microprocessor (in the form of a microchip or chip set), or generally any device for executing instructions. Processor 401 can include a cache memory 422, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 422 may be organized as a hierarchy of more cache levels (L1, L2, etc.).

Processor 401 may be disposed in communication with one or more memory devices (e.g., RAM 409, ROM 410, one or more external databases 421, etc.) via a storage interface 408. Storage interface 408 may also connect to one or more memory devices including, without limitation, one or more databases 421, and/or one or more other memory drives (not shown) including, for example, a removable disc drive, etc., employing connection protocols such as serial advanced technology attachment (SATA), integrated drive electronics (IDE), IEEE-1494, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc.

Memory 402 can include random access memory (RANI) 409 and read only memory (ROM) 410. RAM 409 can be any one or combination of volatile memory elements (e.g., DRAM, SRAM, SDRANI, etc.). ROM 410 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 402 may incorporate electronic, magnetic, optical, and/or other types of non-transitory computer-readable storage media. Memory 402 may also be a distributed architecture, where various components are situated remote from one another, but can be accessed by processor 401.

The instructions in memory 402 may include one or more separate programs, each of which may include an ordered listing of computer-executable instructions for implementing logical functions. In the example of FIG. 4, the instructions in memory 402 may include an operating system 411. Operating system 411 can control the execution of other computer programs and provides scheduling, input-output control, file and data management, memory management, and communication control and related services. The program instructions stored in memory 402 may further include application data 412, and for a user interface 413.

I/O adapter 404 can be, for example but not limited to, one or more buses or other wired or wireless connections. I/O adapter 404 may have additional elements (which are omitted for simplicity) such as controllers, microprocessors, buffers (caches), drivers, repeaters, and receivers, which may work in concert to enable communications. Further, I/O adapter 404 may facilitate address, control, and/or data connections to enable appropriate communications among the aforementioned components.

I/O adapter 404 can further include a display adapter coupled to one or more displays. I/O adapter 404 may be configured to operatively connect one or more input/output (I/O) devices 407 to computer 400. For example, I/O 404 may connect a keyboard and mouse, a touchscreen, a speaker, a haptic output device, or other output device. Output devices 407 may include but are not limited to a printer, a scanner, and/or the like. Other output devices may also be included, although not shown. Finally, the I/O devices connectable to I/O adapter 404 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 400 may include a mobile communications adapter 424. Mobile communications adapter 424 may include GPS, cellular, mobile, and/or other communications protocols for wireless communication.

In some embodiments, computer 400 can further include communications adapter 416 for coupling to a network 406.

Network 406 can be an IP-based network for communication between computer 400 and any external device. Network 406 transmits and receives data between computer 400 and devices and/or systems external to computer 400. In some exemplary embodiments, network 406 can be a managed IP network administered by a service provider. Network 406 may be a network internal to an aircraft, such as, for example, an avionics network, etc. Network 406 may be implemented in a wireless fashion, e.g., using wireless protocols and technologies, such as WiFi, WiMax, etc. Network 406 may also be a wired network, e.g., an Ethernet network, an ARINC 429 network, a controller area network (CAN), etc., having any wired connectivity including, e.g., an RS242 connection, R5422 connection, etc. Network 406 can also be a packet-switched network such as a local area network, wide area network, metropolitan area network, Internet network, or other similar type of network environment. The network 406 may be a fixed wireless network, a wireless local area network (LAN), a wireless wide area network (WAN) a personal area network (PAN), a virtual private network (VPN), intranet or other suitable network system.

Network 406 may operatively connect computer 400 to one or more devices including device 417, device 418, and device 420. Network 406 may also connect computer 400 to one or more servers such as, for example, server 419.

If computer 400 is a PC, workstation, laptop, tablet computer and/or the like, the instructions in the memory 402 may further include a basic input output system (BIOS) (omitted for simplicity). The BIOS is a set of routines that initialize and test hardware at startup, start operating system 411, and support the transfer of data among the operatively connected hardware devices. The BIOS is typically stored in ROM 410 so that the BIOS can be executed when computer 400 is activated. When computer 400 is in operation, processor 401 may be configured to execute instructions stored within the memory 402, to communicate data to and from the memory 402, and to generally control operations of the computer 400 pursuant to the instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for validating a user logon credential for accessing a computer system, the computer-implemented method comprising:
   providing, via a processor, a verification artifact to a user;
   instructing the user to post the verification artifact on a third party system;
   determining, via the processor, an existence of a user post including the verification artifact on the third party system;
   validating, via the processor, the user logon credential based at least in part on the user post of the verification artifact on the third party system, wherein validating the user logon credential comprises:
      determining, via the processor, whether the third party system includes two or more access levels configured to receive a user post;
      differentiating, via the processor, a first access level from a second access level from the two or more access levels; and
      validating the user logon credential based at least in part on a posting location of the verification artifact at one of the first access level and the second access level; and
   enabling access to the computer system based on the validating.

2. The computer-implemented method of claim 1, wherein determining the existence of the user post of the verification artifact comprises:
   identifying, via the processor, a unique user identifier associated with the user post of the verification artifact on the third party system;
   identifying, via the processor, a unique artifact signature of the user post of the verification artifact on the third party system; and
   determining, via the processor, whether the unique artifact signature of the user post of the verification artifact on the third party system matches the provided verification artifact.

3. The computer-implemented method of claim 2, wherein the unique artifact signature comprises steganographic encoding.

4. The computer-implemented method of claim 1, wherein the verification artifact is one or more of a group consisting of an audio file, video file, an image file, a number, or a text string.

5. The computer-implemented method of claim 1 further comprising outputting, via the processor, a user instruction for posting the verification artifact on the third-party system.

6. The computer-implemented method of claim 1, further comprising:
   outputting, via the processor, a user instruction for posting the verification artifact on two or more third-party systems and
   associating, via the processor, a privilege status identifier with the user logon credential based at least in part on a verification of a plurality of user posts of the verification artifact on the two or more third party systems.

7. The computer-implemented method of claim 1, wherein the first access level is a free portion of the third party system and the second access is a paid portion of the third party system.

8. A system for validating a user logon credential for a computer system, the system comprising:
   a processor configured to:
      provide a verification artifact to a user;
      instruct the user to post the verification artifact on a third party system;
      determine an existence of a user post including the verification artifact on the third party system; and
      validate the user logon credential based at least in part on the user post of the verification artifact on the third party system, wherein validating the user logon credential comprises:
         determining, via the processor, whether the third party system includes two or more access levels configured to receive a user post;
         differentiating, via the processor, a first access level from a second access level from the two or more access levels; and
         validating the user logon credential based at least in part on a posting location of the verification artifact at one of the first access level and the second access level; and
      enable access to the computer system based on the validating.

9. The system of claim 8, wherein the processor is configured to:
   identify a unique user identifier associated with the user post of the verification artifact on the third party system;
   identify a unique artifact signature of the user post of the verification artifact on the third party system; and
   determine the existence of the user post of the verification artifact by evaluating whether the unique artifact signature of the user post of the verification artifact on the third party system matches the provided verification artifact.

10. The system of claim 9, wherein the unique artifact signature comprises steganographic encoding.

11. The system of claim 8, wherein the verification artifact is one or more of a group consisting of an audio file, video file, an image file, a number, or a text string.

12. The system of claim 8, wherein the processor is further configured to output a user instruction for posting the verification artifact on the third-party system.

13. The system of claim 8, wherein the processor is further configured to:
output a user instruction for posting the verification artifact on two or more third-party systems; and
associate a privilege status identifier with the user logon credential based at least in part on a verification of a plurality of user posts of the verification artifact on the two or more third party systems.

14. A computer program product for validating a user logon credential for a computer system, the computer program product comprising a computer readable storage medium having program instructions embodied therewith, the program instructions when executed by a processor cause the processor to perform a method comprising:
providing a verification artifact to a user;
instructing the user to post the verification artifact on a third party system;
determining an existence of a user post including the verification artifact on the third party system; and
validating the user logon credential based at least in part on the user post of the verification artifact on the third party system, wherein validating the user logon credential comprises:
determining, via the processor, whether the third party system includes two or more access levels configured to receive a user post;
differentiating, via the processor, a first access level from a second access level from the two or more access levels; and
validating the user logon credential based at least in part on a posting location of the verification artifact at one of the first access level and the second access level; and
enabling access to the computer system based on the validating.

15. The computer program product of claim 14, wherein determining the existence of the user post of the verification artifact comprises:
identifying a unique user identifier associated with the user post of the verification artifact on the third party system;
identifying a unique artifact signature of the user post of the verification artifact on the third party system; and
determining whether the unique artifact signature of the user post of the verification artifact on the third party system matches the provided verification artifact.

16. The computer program product of claim 15, wherein the unique artifact signature comprises steganographic encoding.

17. The computer program product of claim 14, wherein the verification artifact is one or more of a group consisting of an audio file, video file, an image file, a number, or a text string.

18. The computer program product of claim 14, further comprising outputting a user instruction for posting the verification artifact on the third-party system.

* * * * *